Sept. 26, 1950        H. R. BODEMULLER        2,523,858
RADIO APPARATUS FOR VISUALIZING DISTANT OBJECTS
Filed April 17, 1943        3 Sheets—Sheet 1
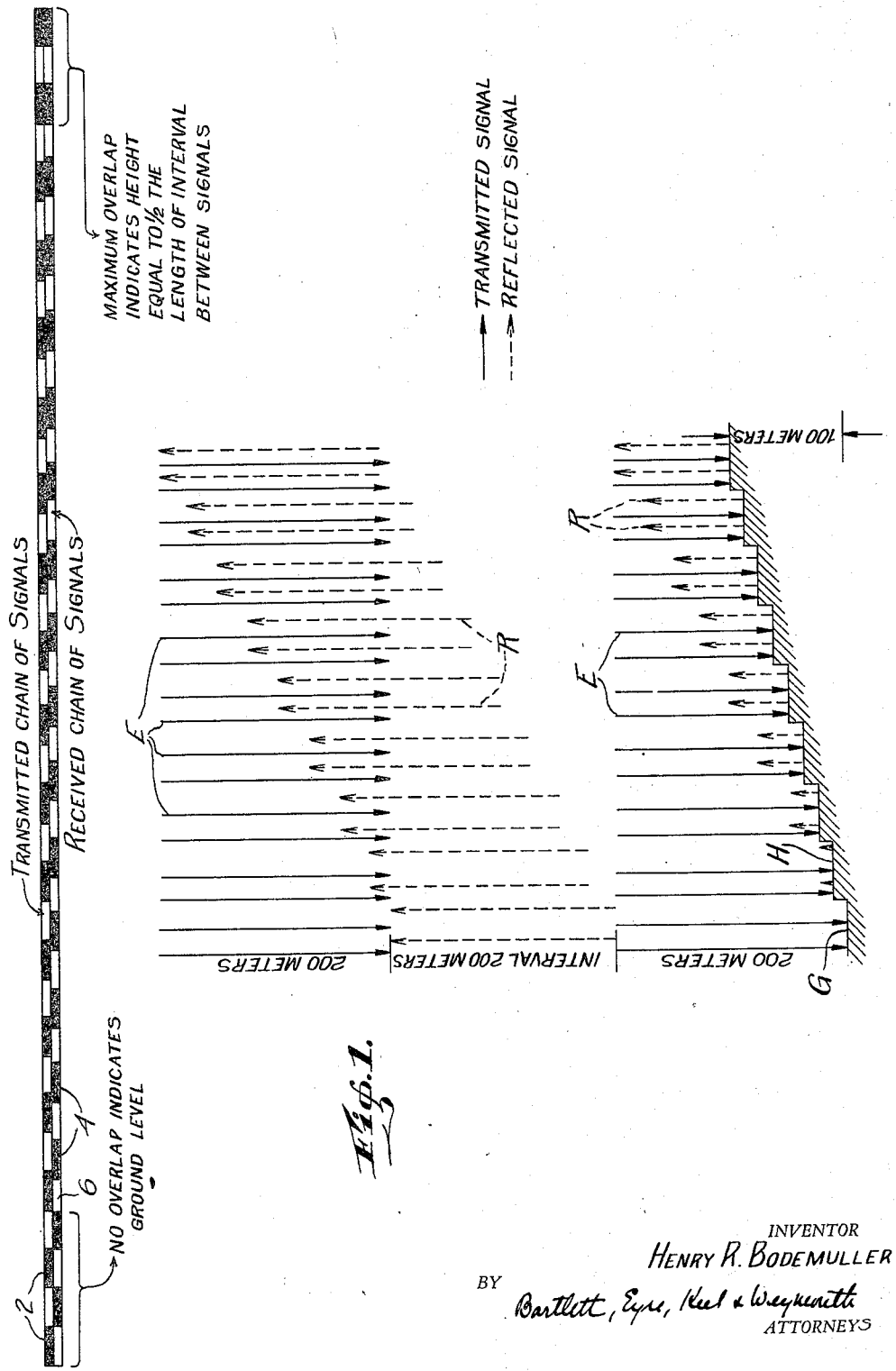
INVENTOR
HENRY R. BODEMULLER
BY
*Bartlett, Eyre, Keel & Weymouth*
ATTORNEYS Sept. 26, 1950    H. R. BODEMULLER    2,523,858
RADIO APPARATUS FOR VISUALIZING DISTANT OBJECTS
Filed April 17, 1943    3 Sheets-Sheet 2
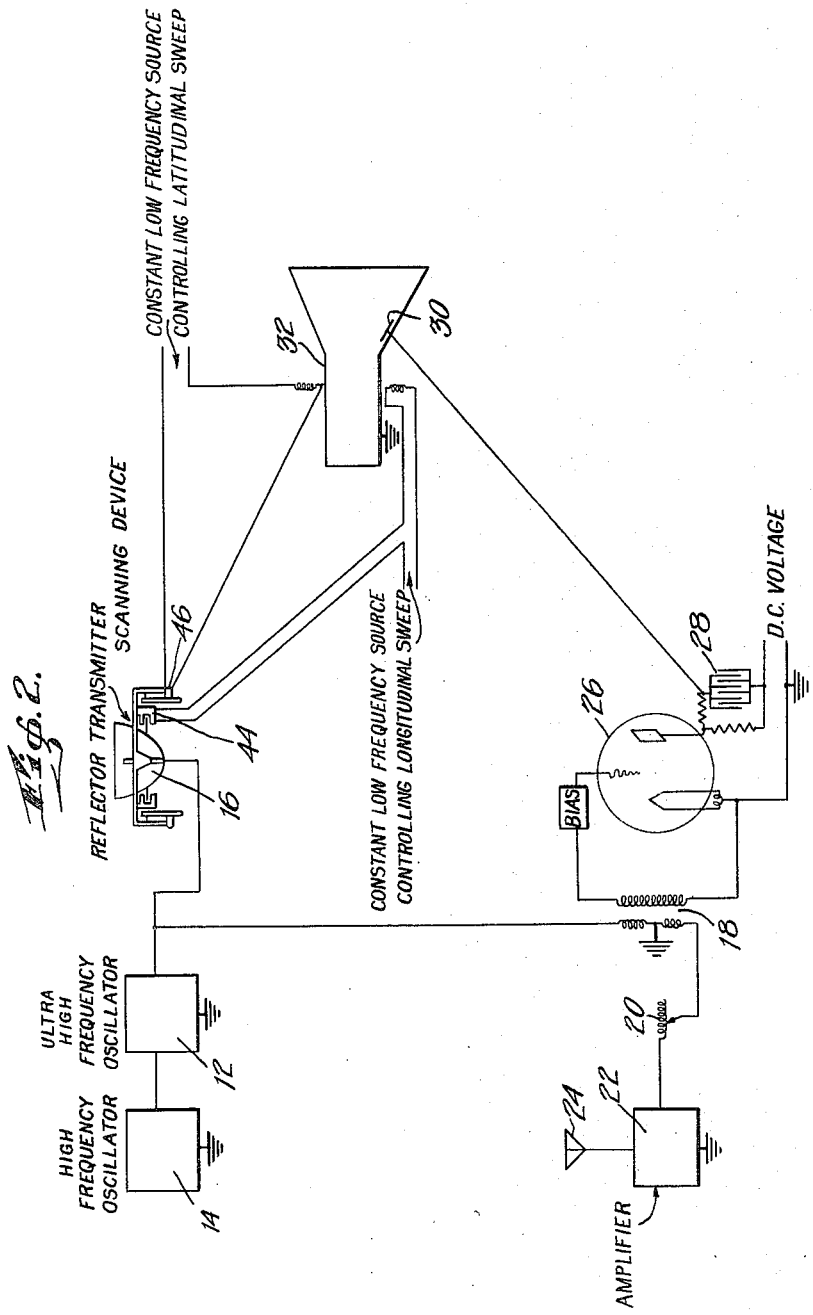
INVENTOR
HENRY R. BODEMULLER
BY
Bartlett, Eyre, Keel & Weymouth
ATTORNEYS

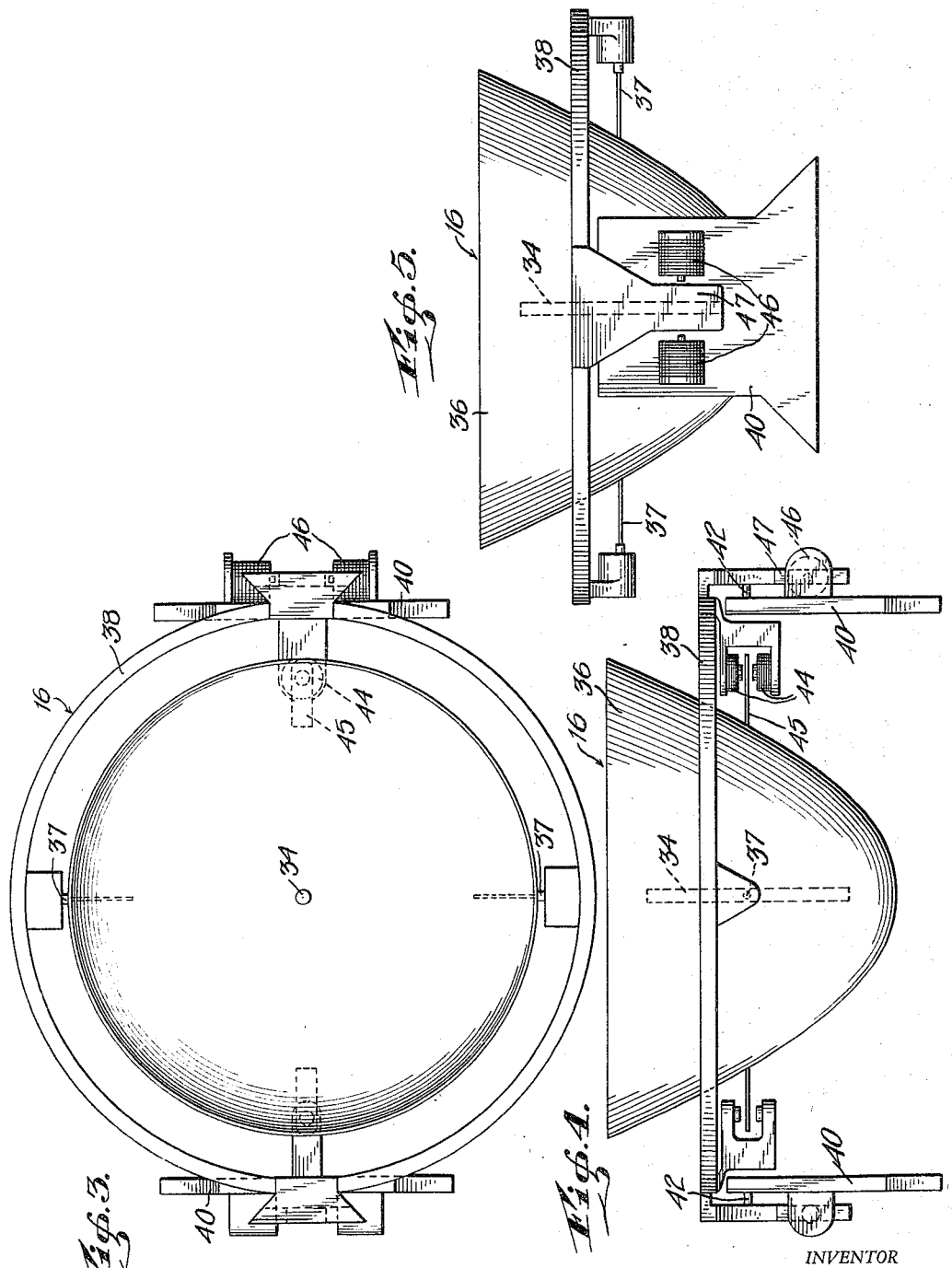

Patented Sept. 26, 1950

2,523,858

UNITED STATES PATENT OFFICE 2,523,858

RADIO APPARATUS FOR VISUALIZING DISTANT OBJECTS

Henry R. Bodemuller, Lafayette, La.

Application April 17, 1943, Serial No. 483,394

15 Claims. (Cl. 343—11)

My present invention relates to detecting devices of the type employing radio means for detecting distant objects, and comprises a novel means and method employing ultra high frequency waves for giving a visual representation of the distant object.

My invention may best be understood as considering it either as a television apparatus utilizing ultra high frequency radio waves in place of light waves for scanning the object and having the transmitting and receiving apparatus located at the same point, or as a long range camera utilizing ultra high frequency radio waves instead of light waves. The many fields of use of such an apparatus, that is of a device which can "see" at night, or through clouds and fog, will be readily apparent. For example, when used on an airplane, the locations of buildings or other installations on the ground, even if camouflaged, or the presence and location of other aircraft may be detected. When used on the ground or on ships the apparatus could be used for locating approaching aircraft, other ships or the docks and buildings on the coast.

For an understanding of the new device and of the theory upon which it operates, reference may be had to the accompanying drawings of which:

Fig. 1 is a chart explanatory of the operation of the system;

Fig. 2 is a diagrammatic layout of the apparatus; and

Figs. 3, 4 and 5 are plan, front and side views, respectively, of the radio scanning means of Fig. 2.

The theory upon which the invention is predicated will first be described in connection with the chart of Fig. 1. If apparatus in an airplane, for example, emitted a series of chains of ultra short radio waves with periods of non-emission between each chain equal in time to the periods of emission, then these chains, after reflection by an object, will be received by the apparatus on the airplane. If the distance from the airplane to the object is such that the reflected chain of waves will be received during a period of non-emission of energy by the apparatus, then a change in the distance equal to one-half of the length of the chain will cause the reflected chain to be received during emission of a chain by the apparatus. This is illustrated in Fig. 1 wherein the solid arrows E represent the emitted chains, there indicated as of 200 meters in length, and the dashed arrows R represent the reflected chains. Note that as the height of the ground or other reflecting object increases from zero to 100 meters (that is as the distance from point of emission to the object decreases by 100 meters) the overlap of the transmitted and reflected chains increases from zero to complete overlap. This is also shown graphically in the upper part of Fig. 1, wherein the solid blocks 2 of the upper row symbolize the periods of emission and the solid blocks 4 of the lower row symbolize the periods of reception of the reflected waves of a transmitter and receiver respectively, located at a distance above the ground level G equal to an odd multiple of one hundred meters. The equal intervals between the blocks 2 of the upper row represent the constant length of the periods of non-emission. At each change in distance between the points of emission and reflection there will be a change in length of the particular interval between the reflected waves corresponding to such change of distance. This is illustrated in Fig. 1 where interval 6, for example, corresponds to the shortened interval between reception of a ray reflected at the ground level G and that reflected at the level H.

From the above description it will be apparent that the periods of overlap of the emitted and reflected signals are a measure of the change in height of the object within the range of half the length of the wave chain. Te apparatus of Fig. 2, to which reference may now be had, represents one arrangement whereby such chains of waves may be utilized to give a visual representation of the object.

In Fig. 2 the reference numeral 12 represents an ultra high frequency generator, producing energy of one meter wave length, for example. A high frequency generator 14 producing energy of say 200 meters wave length, is so connected to the generator 12 as to start and stop the emission of energy thereof in accordance with the frequency of generator 14 and thereby produce the chains of ultra short waves separated by intervals of equal duration. The energy delivered by generator 12 is delivered to a reflector transmitter 16, hereinafter more fully described in connection with Figs. 3 to 5, inclusive, and in parallel to one primary winding of a transformer 18, the other primary winding of which is connected through a phase shifting network 20 and amplifier 22 with the receiving antenna 24. The secondary of transformer 18 is connected in the biased grid circuit of a three-electrode tube 26. With the above arrangement, when the receiving antenna picks up the reflected chains of waves, the voltage impressed on the grid circuit of the tube 26 will vary from that caused by either of the transmitted or received signals alone (corresponding to no overlap) to that caused by the combined transmitted and received signals (overlap). The grid bias is adjusted so that current will flow in the plate circuit only when the voltage across the secondary is due to the summation of transmitted and received signals. The current in the plate circuit will, therefore, be proportional, in time, not magnitude, to the duration of the overlap. This plate current flow is converted into a voltage, the magnitude of which is proportional to the length of the overlap, by a condenser 28, and this varying potential, proportional to the length of overlap of transmitted and received signal, and thus a measure of the varying height of the object, is applied to a control anode 30 in a cathode ray oscillograph 32 so as to vary proportionately the intensity of the cathode ray beam on the fluorescent screen.

The reflector transmitter 16 and the beam of the cathode ray tube 32 are caused to scan in synchronism, as diagrammatically indicated in Fig. 2. Thus, on the fluorescent screen of the cathode ray tube 32 will appear, during the operation of the device, a "contour picture" in which light represents height and dark represents depth. For example, when the radio beam scans a countryside, houses and hills will be shown by varying degrees of lightness, or when the beam scans an approaching aircraft, the aircraft would appear as an area of light in a dark field.

Any suitable means could be employed for directing the radio beam of interrupted chains of waves. One suitable arrangement is shown in Figs. 3 to 5 as including the half wave antenna 34 positioned within a reflector 36. Reflector 36 is pivotally mounted on pins 37 carried by a ring 38 which in turn is rotatably mounted on fixed supports 40 by means of pins 42; ring 38 being oscillatable about an axis at right angles to the axis of oscillation of reflector 36. Oscillation of reflector 36 about the pins 37 is controlled by coils 44 carried by the ring 38 and cooperating with an armature 45 carried by the reflector 36. Coils 44 are connected in series with the coils of cathode ray tube 32 controlling the longitudinal sweep of the beam as shown in Fig. 2. Oscillation of reflector 36 about the axis normal to rod 37 is controlled by coils 46 mounted on the support 40 and cooperating with the armature 47 carried by the ring 38. Coils 46 are connected in series with the coils of the cathode ray tube controlling the latitudinal sweep of the beam as shown in Fig. 2. Thus the transmitted beam of radio waves is made to scan the object in synchronism with the cathode ray beam traversing the fluorescent screen. Where magnification is desired, it is only necessary to reduce the scanning angle of the transmitter reflector while maintaining full sweep of the cathode ray beam.

From the above description of the invention it will be apparent that the limits of height "televised," or the range of the apparatus, is determined solely by the length of the transmitted chains and the corresponding interval therebetween and not by the wavelength of the transmitted waves nor by the distance from the object. In other words, if the length of chain is 50 meters, then maximum light variation is proportional to variation of 25 meters in distance, irrespective of how great may be the total distance, and conversely if objects varying in height of 150 meters are to be "televised" chains of 300 meters length would be employed.

The invention has now been described in connection with one embodiment thereof. Obviously various alternative arrangements for utilizing the transmitted and reflected signals for giving a representation of the contour of the object "televised" will suggest themselves to those skilled in the art. Many uses of the apparatus in addition to those heretofore suggested will be apparent. It would, for example, be of great value to the pilot of a bomber flying at night over area previously photographed, as he could locate therewith the buildings or other ground installations comprising his target. Alternatively the apparatus could be used on reconnaissance flights to obtain records which when compared with ordinary aerial photographs would disclose the camouflaged areas of the enemy. In this case, of course, the apparatus would include suitable photographic equipment for making a permanent record of the visual representations obtained by the device.

I claim:

1. A radio "television" equipment comprising in combination means for emitting a series of chains of ultra short radio waves separated by intervals equal in time to the time length of each chain, means for automatically scanning an area with said emitted waves both laterally and longitudinally for reflection by the objects within the scanned area, means for receiving the reflected chains of waves, and means responsive to the emitted chains of waves and to the received chains of waves for giving a visual representation of the scanned area.

2. A radio "television" equipment comprising in combination means for continuously scanning a distant defined area with a series of chains of ultra short radio waves separated by intervals equal in time to the time length of each chain, means for receiving the chains of waves reflected by objects within the defined area and means including a source of light controlled by the concurrent emission and reception of a chain of waves for giving a visual representation of the distant defined area with variations in elevation of the objects therein through a range of one-half the length of a chain represented by graduations of the intensity of the light from said source.

3. The equipment according to claim 2 wherein said last mentioned means includes an oscilloscope, means synchronizing the sweep controls with the scanning of the object by the chains of waves and means controlling its beam intensity in accordance with the length of overlap of the emitted and received chains of waves.

4. A radio "television" equipment comprising in combination means for emitting chains of ultra short radio waves of equal length separated by intervals of time equal to the period of emission of each chain, means for scanning a distant object with said series of chains, means for receiving the chains of waves reflected by the object, and means responsive to the emitted and received chains for giving a contour picture of the object, said last mentioned means including an oscilloscope connected with said scanning means for synchronization of the cathode ray beam with the emitted chains of radio waves.

5. A radio "television" equipment comprising in combination an ultra high frequency generator, a high frequency generator connected therewith for causing the same to operate intermittently, a transmitting device connected with said ultra high frequency generator for emission of chains of ultra short radio waves corresponding to the energy intermittently delivered thereto by said ultra high frequency generator, said transmitting device including a reflector and means for oscillating the same about mutually perpendicular axes to cause the emitted radio beam of chains of short waves to scan a distant object, a receiver receiving the chains of short waves reflected by said object, a cathode ray oscilloscope having the latitudinal and longitudinal sweep controls of the cathode ray beam connected with the means for oscillating said transmitting device to synchronize the scanning of the cathode ray beam with the beam of chains of radio waves, and means for varying the intensity of the cathode ray beam in accordance with the length of overlap of the emitted and received chains of waves whereby changes in height of the distant object through a range equal to one-half the length of a chain of waves may be visually represented on the fluorescent screen of the oscilloscope by variations in light intensity.

6. A radio "television" equipment comprising in combination means including an intermittently operated ultra high frequency generator and a transmitting device for emitting a series of chains of ultra short radio waves separated by intervals of time equal to the periods of emission of the chains, means for scanning a distant area with the transmitted chains of waves, means for receiving the chains of waves reflected by objects in the scanned area, a three-electrode tube coupled to said ultra short wave generator and to said receiver and biased to pass current only during the periods of concurrent emission and reception of a chain of waves, means in the output circuit of said tube for creating a voltage varying in magnitude proportionately to the periods of current delivery of the tube, and a cathode ray oscilloscope connected with said last mentioned means for variation of the intensity of the cathode ray beam thereby, said oscilloscope having its beam sweep controls connected with the scanning means for the transmitted chains of waves for synchronous scanning of the cathode ray beam with the beam of chains of ultra short waves.

7. The method of detecting the presence of objects to be bombed which comprises the steps of scanning both laterally and longitudinally the general vicinity of the object from the air with a beam comprising a series of chains of ultra short wave radio waves, then receiving the chains of radio waves reflected from the vicinity, comparing the emitted and received chains of waves to determine the overlap thereof and finally varying the intensity of a cathode ray beam in accordance with the amount of such overlap to give a visual indication of the vicinity including the object.

8. The method of detecting the presence of objects to be bombed which comprises scanning both laterally and longitudinally an area including the object from the air with a beam consisting of a series of chains of ultra short radio waves, receiving the chains of waves reflected from the scanned area, comparing the transmitted and received chains of radio waves to determine the overlap thereof and finally varying in accordance with the amount of such overlap the intensity of a ray scanning in synchronism with the radio beam to obtain a visual representation of the object.

9. The method of determining graduations in level of an object throughout a given range which comprises scanning the object from a height with a beam of ultra short radio waves in the form of a series of chains each equal in length to twice the given range and separated by equal intervals of time, receiving the chains of waves reflected from the different levels of the object, then controlling in accordance with the periods of concurrent emission and reception of a chain the intensity of a light generating ray scanning in synchronism with the radio beam to obtain graduations in light intensity corresponding to graduations in levels of the object.

10. The method of visually representing differences in elevation, through a given range, of objects in a distant defined area which comprises continuously scanning the area in two mutually perpendicular directions with a chain of ultrashort radio wave groups, each group of a length equal to twice the given range and separated by intervals equal in time to the duration time of a wave group, receiving the chain of wave groups after reflection from the objects in the area, and finally varying in accordance with the amount of overlap of the groups of the scanning and reflected chains the intensity of a light generating beam scanning in synchronism with the chain.

11. The method of determining differences in elevation of parts of a distant object which comprises continuously transmitting a chain of ultra-high frequency radio wave groups separated by intervals equal in time to the duration time of a wave group, scanning the object in two mutually perpendicular directions with the transmitted chain for reflection thereof from different parts of the object, receiving the reflected chain and determining the differences in elevation from variations in length of the intervals preceeding reception of groups reflected from different parts of the object.

12. The method of visually representing objects in a distant area which comprises continuously transmitting a chain of ultra short radio wave groups separated by intervals equal in time to the duration time of a wave group, scanning the distant area in two mutually perpendicular directions with the transmitted chain for reflection thereof by the objects, receiving the reflected chain of wave groups and finally varying, in accordance with the amount of overlap of the group of the scanning and reflected chains, the intensity of a light generating beam scanning in synchronism with the chain to give a light and shade picture of the area in which differences in light intensity correspond to differences in distance of the object from the point of transmission and reception within a range equal to one-half the length of a wave group.

13. The method of mapping contour lines in an area comprising the transmission of directional pulses toward said area and successively displacing the direction of said pulses to scan the area, receiving reflections of said pulses, and indicating the degree of overlap of the transmitted and received pulses in terms of brilliancy of a point of light on a screen, said point of light being successively displaced on said screen to scan it in synchronism with the area aforesaid.

14. The method of mapping contour lines in an area comprising the transmission of directional pulses toward said area and successively displacing the direction of said pulses to scan the area, receiving reflections of said pulses and visibly indicating contours on a screen representing said area, said contours being indicated in terms of light intensities proportional to the overlap between the transmitted and the received signals directed toward and received from corresponding portions of the area being mapped.

15. The method of determining differences in elevations of parts of a distant object or objects in an area which comprises continuously and successively transmitting chains of ultra high frequency radio waves separated by predetermined time intervals, said wave chains being less than the absolute distance from the most distant point of the area to the point of transmission, successively displacing the direction of transmission of said chains to scan the area, receiving the reflected chains and determining the differences in elevation from variations in lengths of the intervals occurring between the times of transmission of the chains and the times of reception of the reflections of the chains from different parts of the area by superposing the transmitted chains and the reflected chains upon a receiver.

HENRY R. BODEMULLER.

REFERENCES CITED

The following references are of record in the file of this patent:

UNITED STATES PATENTS

| Number | Name | Date |
|---|---|---|
| 1,585,591 | Lowy | May 18, 1926 |
| 1,924,174 | Wolf | Aug. 29, 1933 |
| 2,225,046 | Hunter | Dec. 17, 1940 |
| 2,227,598 | Lyman et al. | Jan. 7, 1941 |
| 2,231,929 | Lyman | Feb. 18, 1941 |
| 2,247,662 | Newhouse | July 1, 1941 |
| 2,409,448 | Rost | Oct. 15, 1946 |
| 2,426,189 | Espenschied | Aug. 26, 1947 |
| 2,455,673 | Hansell | Dec. 7, 1948 |